United States Patent
Recht

(10) Patent No.: US 6,876,776 B2
(45) Date of Patent: Apr. 5, 2005

(54) SYSTEM AND METHOD FOR AUTO-FOCUSING AN IMAGE

(75) Inventor: Joel M. Recht, Monsey, NY (US)

(73) Assignee: Ikonicys, Inc., New Haven, CT (US)

( * ) Notice: Subject to any disclaimer, the term of this patent is extended or adjusted under 35 U.S.C. 154(b) by 37 days.

(21) Appl. No.: 10/368,055

(22) Filed: Feb. 14, 2003

(65) Prior Publication Data

US 2004/0161160 A1 Aug. 19, 2004

(51) Int. Cl.[7] .................................................. G06K 9/40
(52) U.S. Cl. ..................... 382/255; 382/128; 348/349
(58) Field of Search ................................. 382/128–132; 348/345–356; 250/201.3–201.7

(56) References Cited

U.S. PATENT DOCUMENTS

| | | | | |
|---|---|---|---|---|
| 5,040,228 A | * | 8/1991 | Bose et al. ................. | 382/141 |
| 5,625,705 A | * | 4/1997 | Recht ......................... | 382/128 |
| 5,647,025 A | | 7/1997 | Frost et al. | |
| 5,710,829 A | * | 1/1998 | Chen et al. ................. | 382/173 |
| 5,768,401 A | * | 6/1998 | Csipkes et al. ............. | 382/255 |
| 5,790,710 A | | 8/1998 | Price et al. | |
| 5,809,169 A | | 9/1998 | Rezzouk et al. | |
| 6,151,415 A | | 11/2000 | Acharya et al. | |
| 6,154,574 A | | 11/2000 | Paik et al. | |
| 6,341,180 B1 | * | 1/2002 | Pettersson et al. .......... | 382/255 |
| 6,640,104 B1 | * | 10/2003 | Borst et al. ................. | 455/450 |

FOREIGN PATENT DOCUMENTS

WO    WO 2004/074882 A2    9/2004

OTHER PUBLICATIONS

Firestone et al., "Composition of Autofocus Methods for Automated Microscopy", Cytometry 12:195–206 (1991).
Luo et al., "Design and Implementation of New Auto–focusing Algorithms for Intelligent Robot Eye–in–Hand System," IEEE, pp. 11–16, 1987.

* cited by examiner

Primary Examiner—Jingge Wu
(74) Attorney, Agent, or Firm—Pillsbury Winthrop LLP

(57) ABSTRACT

A method and system for auto-focusing is disclosed where the number of the fractal pixels having a fractal dimension within a predetermined range is determined. The focused image is determined by adjusting the image to maximize the fractal pixel count. Alternatively, the focused image may be selected from a set of images, the image having the largest fractal pixel count selected as the focused image.

20 Claims, 4 Drawing Sheets

SYSTEM AND METHOD FOR AUTO-FOCUSING AN IMAGE

FIELD OF THE INVENTION

The present invention relates to digital imaging. More specifically, the invention relates to systems and methods for automated focusing of an image.

BACKGROUND OF THE INVENTION

It is well known that manual evaluation of biological samples is both slow and highly susceptible to error. It is also well known that automating the sample evaluation both increases the sample evaluation rate and reduces error.

FIG. 1 is a schematic of an automated scanning optical microscopy system. The automated scanning optical microscopy system 100 includes an optical microscope modified to automatically capture and save images of a sample 105 placed on a sample holder 107 such as, for example, a slide, which in turn is supported by a stage 110. The optical components include an illumination source 120, objective lens 124, and camera 128. Housing 130 supports the optical components. The design and selection of the optical components and housing are known to one of skill in the optical art and do not require further description.

The automated system 100 includes a controller that enables the stage 110 supporting the slide 107 to place a portion of the sample 105 in the focal plane of the objective lens. The camera 128 captures an image of the sample and sends the image signal to an image processor for further processing and/or storage. In the example, shown in FIG. 1, the image processor and controller are both housed in a single PC 104 although other variations may be used. The mechanical design of the stage 110 is known to one of skill in the mechanical arts and does not require further description.

The controller may also control a sample handling subsystem 160 that automatically transfers a slide 109 between the stage 110 and a storage unit 162.

The controller must also be capable of positioning the sample such that the image produced by the camera 128 is in focus. In addition, the controller must be able to position the sample very rapidly in order to reduce the time required to capture an image.

One method of auto-focusing an image employs a laser range finder. The controller calculates the distance to a surface based on the signal from the laser range finder. The advantage of such a system is that it is very fast, thereby increasing the scan rate of the automated system. The disadvantage of such a system is that it requires additional hardware that may interfere with the optical performance of the automated system. A second disadvantage of such a system is the inability to focus directly on the feature of interest in the sample. The signal from the laser range finder is usually based on the highest reflective surface encountered by the laser beam. This surface is usually the cover slip or the slide and not the sample.

Another method of auto-focusing an image employs image processing to determine when the image is in focus or, alternatively, select the most focused image from a set of images taken at different sample-objective lens distances. The advantage of using image processing to auto-focus is that it can focus directly on the sample instead of the slide or cover slip. The disadvantage of image processing auto-focus is that it usually requires large computational resources that may limit the scan rate of the automated system. The large computational requirement arises because prior art algorithms based on maximizing the high frequency power spectrum of the image or on detecting and maximizing edges must perform large numbers of computations.

Therefore, there remains a need for a rapid auto-focusing method that does not require large computational resources and can directly focus the sample.

SUMMARY OF THE INVENTION

One embodiment of the present invention provides a method for automatically focusing an object comprising: acquiring at least one image of the object, the image characterized by a focal distance and comprising at least one pixel; determining a fractal pixel count of pixels having a fractal dimension within a predetermined range; and selecting an optimal focal distance from the image having the largest fractal pixel count.

Another embodiment of the present invention provides an apparatus for automatically focusing an object comprising: an image capture sensor for capturing an image of the object, the captured image characterized by a focal distance; a fractal estimator coupled to the image capture sensor, the fractal estimator adapted to estimate a fractal dimension of at least one pixel of the captured image; and a focus controller coupled to the fractal estimator, the focus controller adapted to adjust the focal distance of the object based on maximizing the number of pixels having an estimated fractal dimension within a predetermined range.

Another embodiment of the present invention provides an apparatus for automatically focusing an object comprising: an image capture sensor for capturing an image of the object, the captured image characterized by a focal distance; means for determining a fractal pixel count of the captured image; and means for controlling the focal distance based upon maximizing the fractal pixel count of the captured image.

Another embodiment of the present invention is directed to a computer program product for use with an automated microscopy system, the computer program product comprising: a computer usable medium having computer readable program code means embodied in the computer usable medium for causing the automated microscopy system to automatically focus an object, the computer program product having: computer readable code means for causing a computer to acquire an image of the object at a focal distance; computer readable code means for causing the computer to determine a fractal pixel count of the acquired image; and computer readable code means for causing the computer to adjust the focal distance of the object based upon maximizing the fractal pixel count of the acquired image.

BRIEF DESCRIPTION OF THE DRAWINGS

The invention will be described by reference to the preferred and alternative embodiments thereof in conjunction with the drawings in which.

DETAILED DESCRIPTION OF THE PREFERRED AND ALTERNATIVE EMBODIMENTS

An underlying idea supporting current auto-focusing algorithms is that an image in focus will exhibit the largest pixel-to-pixel variations (the difference of pixel values between adjacent pixels) whereas an out-of-focus image will blur, or reduce, the pixel-to-pixel variations in the image. Autocorrelation or power spectrum algorithms are designed to measure and/or maximize the high frequency (variations occurring over a small number of pixels) component of an image. Autocorrelation, however, is a computationally intensive process that is prohibitive when considered for high scanning rate automated optical microscopy.

Maximum gradient methods avoid performing an autocorrelation by detecting edges and maximizing the variation across the edge. The maximum gradient method calculates the differences between adjacent pixels along a pre-selected direction and several directions may be used to find and maximize the pixel gradient across edges. The ability of the maximum gradient method to find the correct focus decreases as the contrast and/or brightness of the image decreases because decreasing contrast or brightness also decreases the differences between pixels.

The inventor has surprisingly discovered a method for auto-focusing that requires neither a direct calculation of the pixel-to-pixel variations of the maximum gradient method nor the computationally intensive autocorrelation of the power spectrum methods. Instead, the present invention analyzes each image at different scale lengths to calculate a fractal dimension for each pixel in the image. Furthermore, the fractal dimension is estimated using the pixel values of the neighborhood pixels instead of a count of the neighborhood pixels. The fractal dimension is then used to determine if the image is a focused image.

Figure 1:
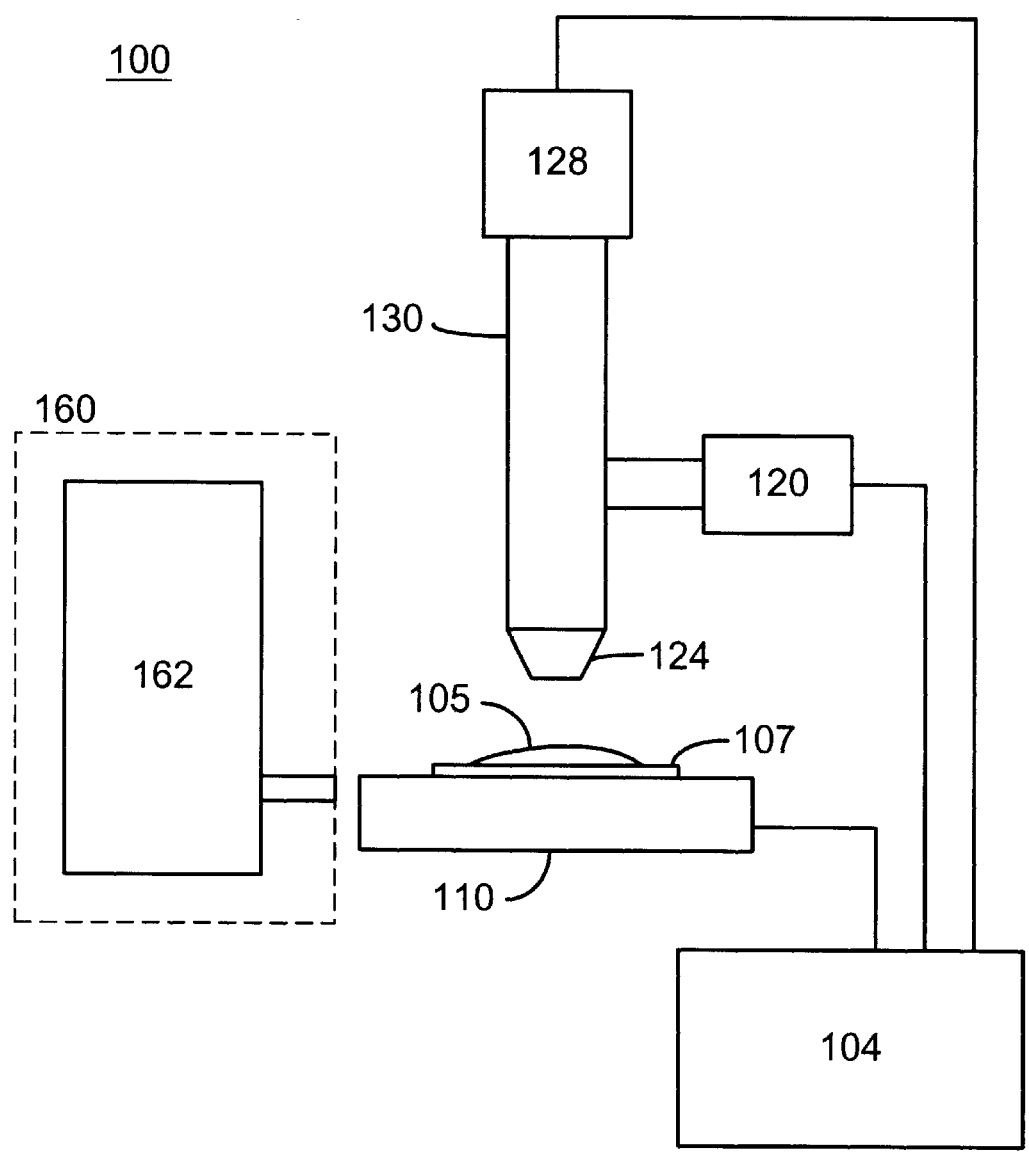
FIG. 1 is a schematic diagram of a prior art automated scanning optical microscopy system.
Figure 2:
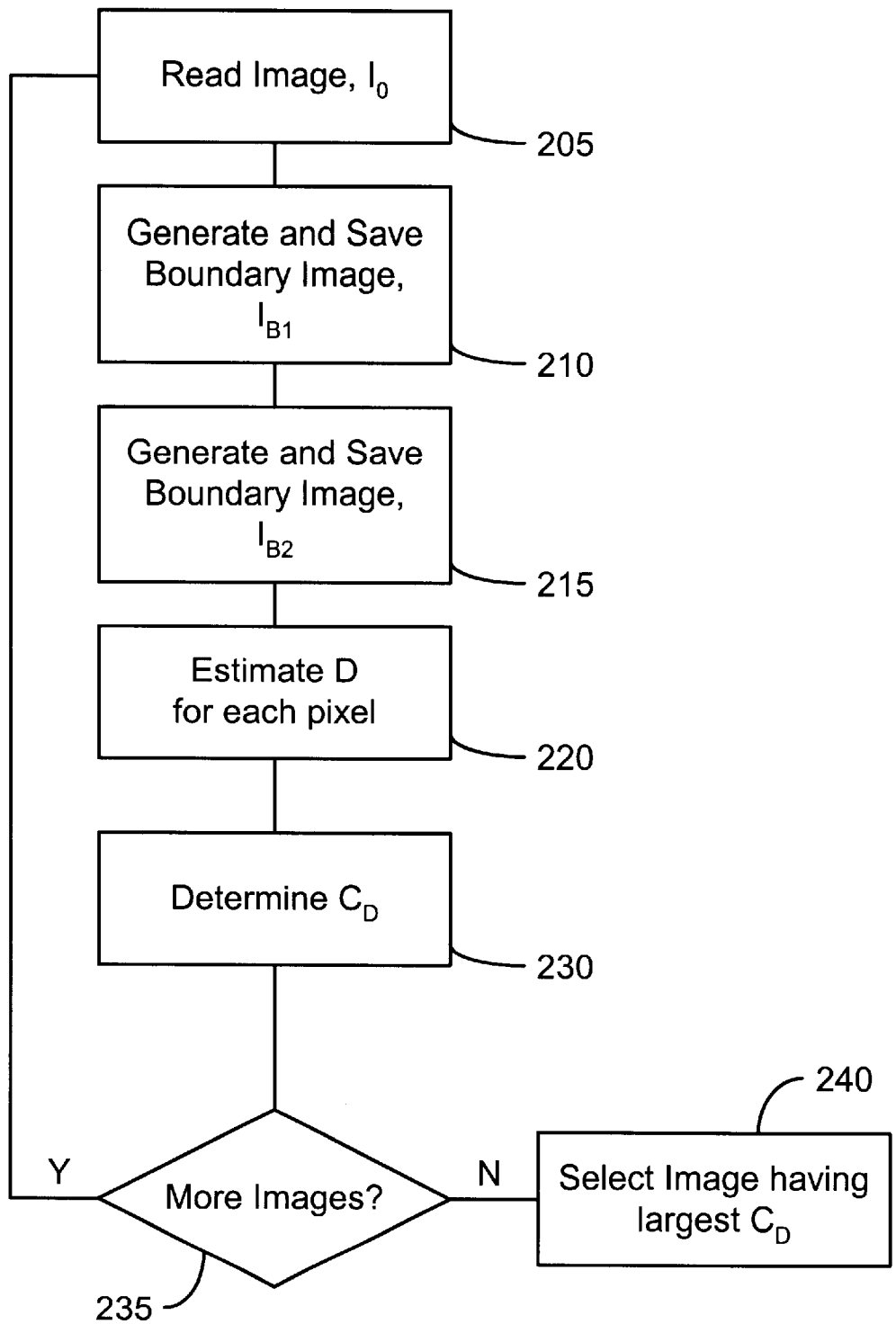
FIG. 2 is a flowchart of an embodiment of the present invention.

FIG. 2 is a flow diagram of one embodiment of the present invention. An image, $I_0$, is read in step 205. The image may be read directly from a camera or may be read from memory. In one embodiment, the controller captures several images of the sample at various sample-objective lens distances and stores each captured image in an appropriate memory device such as a hard drive, an optical drive, or semiconductor memory. In an alternative embodiment, after each image is captured, the process shown in FIG. 2 is completed and only images meeting criteria described below are saved to a memory device.

In step 210, a first boundary image, $I_{B1}$, is generated from $I_0$ and stored. A second boundary image, $I_{B2}$, is generated from $I_0$ and stored in step 215.

Figures 3, 4A, 4B:
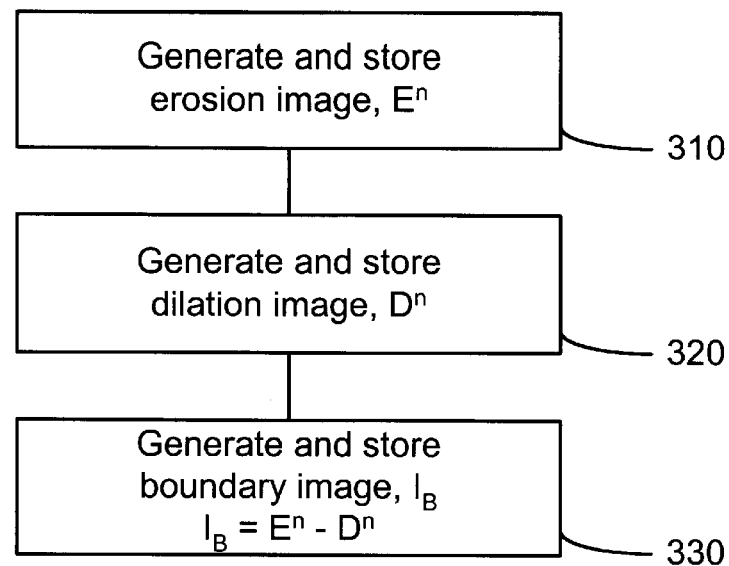
FIG. 3 is a flowchart illustrating the generation of a boundary image in an embodiment of the present invention.
FIG. 4a is a diagram illustrating an L=3 structuring element used in one embodiment of the present invention.
FIG. 4b is a diagram illustrating an L=3 structuring element used in another embodiment of the present invention.

FIG. 3 is a flow diagram illustrating the generation of each boundary image, $I_B$. An erosion image, $E^L$, is generated from the captured image, $I_0$, and stored in step 310. A dilation image, $D^L$, is generated from $I_0$ and stored in step 320. In step 330, the boundary image, $I_B$, is generated by subtracting the erosion image from the dilation image, i.e., $I_B = D^L - E^L$. The superscript, L, in $E^L$ and $D^L$ both refer to the size, or scale, of the structuring element used to perform the erosion or dilation, respectively.

The structuring element may be represented by an L×L matrix comprised of ones and zeros. The structuring element is characterized by an origin pixel and a neighborhood. The neighborhood comprises all the matrix elements that are set to one and is contained within the L×L matrix. An image is generated by calculating a pixel value for the pixel at the origin of the structuring element based on the pixel values of the pixels in the neighborhood of the structuring element. In the case of erosion, the pixel value of the origin pixel is set to the minimum of the pixel values in the neighborhood. Dilation, in contrast, sets the pixel value to the maximum of the pixel values in the neighborhood. In one embodiment, the neighborhood is coextensive with the structuring element where the L×L matrix comprised of all ones, as shown in FIG. 4a for an L=3 structuring element. In another embodiment, the neighborhood is less than the structuring element in that the L×L matrix includes at least one zero. In another embodiment, the neighborhood is a "cross" or "plus" centered on the origin of the structuring element, as shown in FIG. 4b for an L=3 structuring element.

Referring to FIG. 2, step 215 generates a second boundary image, $I_{B2}$, at a different scale, $L_2$, using a different size structuring element than the structuring element used to generate $I_{B1}$. The selection of the scale for both boundary images may depend on the feature size of the object of interest, the computational limitations of the processor, and other such factors as is apparent to one of skill in the art. In one embodiment, $L_1$ and $L_2$ are selected to maximize the difference between $L_1$ and $L_2$ under constraints such as those identified above. In one embodiment, $L_1$ may be chosen from the group consisting of greater than 2, 3, 4, 5, and greater than 5. In a preferred embodiment, the scale of $I_{B1}$ is set to $L_1=3$ because L=3 represents the minimum, non-trivial balanced (in the sense that the origin is centered in the structuring element) structuring element. $L_2$ is selected such that $L_2$ is greater than $L_1$ or, stated differently, the ratio, $R=L_2/L_1>1$. In one embodiment, R is in the range selected from a group consisting of 1–4, 4–8, 8–16, and greater than 16. In a preferred embodiment, R=7.

The fractal dimension, $d_p$, for each pixel in $I_0$ is estimated from the boundary images $I_{B1}$, and $I_{B2}$ in step 220. The fractal dimension for each pixel may be estimated by the equation (1):

$$d_p = \frac{\log\left(\frac{N_2}{N_1}\right)}{\log\left(\frac{L_2}{L_1}\right)} \quad (1)$$

where $N_2$ represents the sum of the pixel values in the neighborhood of the structuring element centered on the pixel in $I_{B2}$ and $N_1$ represents the sum of the pixel values in the neighborhood of the structuring element centered on the pixel in $I_{B1}$.

In an alternative embodiment, the fractal map is generated directly from $I_0$. The fractal dimension for a pixel is estimated by centering an $L_1 \times L_1$ structuring element on the pixel and summing the pixel values of the pixels within the structuring element to form a first sum, $N_1$. A second structuring element of size $L_2 \times L_2$, where $L_2 > L_1$, is centered on the pixel and a second sum, $N_2$, of the pixel values of the pixels within the second structuring element is calculated. The fractal dimension of the pixel is estimated using the equation $$d_p = \frac{\log(N_2/N_1)}{\log(L_2/L_1)} \quad (2)$$

where $d_p$ is the fractal dimension of the pixel in $I_0$, $N_2$ is the sum of the pixel values in the $L_2 \times L_2$ structuring element, $N_1$ is the sum of the pixel values in the $L_1 \times L_1$ structuring element, and $L_2$ and $L_1$ are the sizes (in pixels) of the respective structuring elements.

The form of equation (1) clearly shows that the fractal dimension is estimated by taking ratios of pixel values and therefore should provide a more robust method than maximum gradient methods of identifying out-of-focus images in low light or low contrast conditions. Furthermore, it is believed that the use of sums in $N_1$ and $N_2$ reduces the statistical variations that may be expected in low light conditions.

The inventor has discovered that images containing many pixels having a fractal dimension within a range of values tend to be more in-focus than images containing few pixels having fractal dimensions within the range.

The predetermined range of fractal dimensions may be determined by one of skill in the art by visually examining a group of images and selecting the range such that at least one image but not all the images are considered to be nearly in-focus. Setting the range narrowly may exclude all the images whereas setting the range broadly reduces the effectiveness of this test. In one embodiment, the predetermined range is between 1 and 2. In a preferred embodiment, the predetermined range is chosen from a group consisting of 1–1.25, 1.25–1.5, 1.5–1.75, 1.75–2, 1.5–2, and 1.6–2.

In one embodiment, the predetermined range is determined by an operator before auto-focusing operations. In an alternate embodiment, the predetermined range may be set to a default range and dynamically adjusted during auto-focusing operations to produce at least one in-focus image.

After $d_p$ is estimated for each pixel in $I_0$, a count of the fractal pixels in the image is performed in step 230. A fractal pixel is a pixel having a fractal dimension within the predetermined range. The fractal pixel count, $C_d$, is the number of fractal pixels in the image.

After $C_d$ is determined for the captured image, step 235 checks for additional images. If there are additional images, control jumps back to step 205 to repeat the process for the additional image. If there are no more additional images, the focus image is determined in step 240 by selecting the image having the largest $C_d$ from the set of images.

Figure 5:
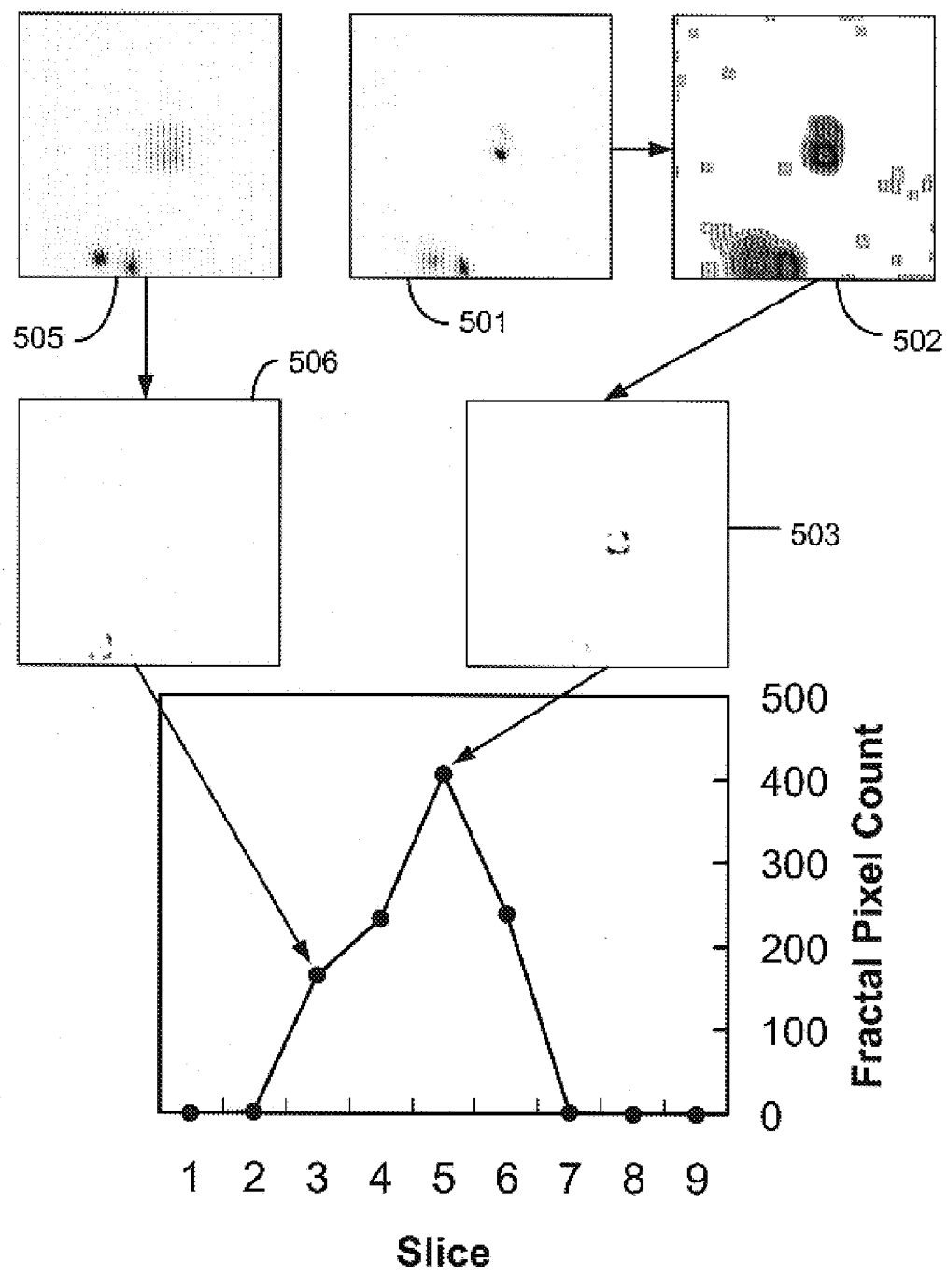
FIG. 5 is a graph of $C_D$ vs. S produced by the embodiment shown in FIG. 2.

FIG. 5 is a graph illustrating the selection of the in-focus image from a set of images taken at different focal distances. In the example shown in FIG. 5, 9 slices, or images taken at progressively larger focal distances are numbered from 1 to 9 on the horizontal axis. The fractal pixel count for each slice is shown on the ordinate axis. In this example, slice 5 contains the highest number of fractal pixels of the 9 slices and is selected as the in-focus image. The slice 5 image 501 is shown in FIG. 5, along with the slice 3 image 505, which is an out-of-focus image. A fractal dimension map 502 shows the estimated fractal dimension for each pixel in the slice 5 image. Fractal pixel images 503 506 show the fractal pixels in the slice 5 and slice 3 images, respectively.

Having described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A method for automatically focusing an object comprising:
   acquiring at least one image of the object, the image characterized by a focal distance and comprising at least one pixel;
   determining a fractal pixel count of pixels having a fractal dimension within a predetermined range; and
   selecting an optimal focal distance from the image having the largest fractal pixel count.

2. The method of claim 1 wherein the predetermined range is selected from a group consisting of 1–2, 1–1.25, 1.25–1.5, 1.5–1.75, 1.75–2, 1.5–2, and 1.6–2.

3. The method of claim 1 wherein acquiring includes applying a smoothing filter to the acquired image.

4. The method of claim 1 wherein determining the fractal pixel count includes estimating a fractal dimension for at least one pixel of the image, the fractal dimension of the pixel given by $$d_p = \frac{\log(N_2/N_1)}{\log(L_2/L_1)}$$

where $d_p$ is the fractal dimension of the at least one pixel of the image, $N_2$ is the sum of the pixel values in an $L_2 \times L_2$ structuring element, $N_1$ is the sum of the pixel values in an $L_1 \times L_1$ structuring element, and $L_2$ and $L_1$ are the sizes (in pixels) of the respective structuring elements.

5. The method of claim 1 wherein determining further includes:
   forming a plurality of boundary images from the acquired image, each of the plurality of boundary images characterized by a scale;
   estimating the fractal dimension of at least one pixel of the acquired image from the plurality of boundary images; and
   incrementing the fractal pixel count if the estimated fractal dimension of the at least one pixel is within the predetermined range.

6. The method of claim 5 wherein the plurality of boundary images includes two boundary images.

7. The method of claim 5 wherein forming boundary image further includes:
   eroding the acquired image by a L×L structuring element to form an eroded image;
   dilating the acquired image by an L×L structuring element to form a dilated image; and
   forming the boundary image by subtracting the eroded image from the dilated image, the scale of the boundary image defined by L.

8. The method of claim 5 wherein the scale of at least one of the plurality of boundary images is selected from a group consisting of greater than 2, 3, 4, 5, and greater than 5.

9. The method of claim 8 wherein the scale is 3.

10. The method of claim 8 wherein a second scale is greater than a first scale.

11. The method of claim 10 wherein the second scale is determined such that a ratio of the second scale to the first scale is in a range selected from a group consisting of 1–4, 4–8, 8–16, and greater than 16.

12. The method of claim 11 wherein the ratio of the second scale to the first scale is 7.

13. The method of claim 7 wherein the structuring element has a neighborhood coextensive with the structuring element.

14. The method of claim 7 wherein the structuring element has a neighborhood less than the structuring element.

15. An apparatus for automatically focusing an object comprising:
   an image capture sensor for capturing an image of the object, the captured image characterized by a focal distance;
   a fractal estimator coupled to the image capture sensor, the fractal estimator adapted to estimate a fractal dimension of at least one pixel of the captured image; and a focus controller coupled to the fractal estimator, the focus controller adapted to adjust the focal distance of the object based on maximizing the number of pixels having an estimated fractal dimension within a predetermined range.

16. The apparatus of claim 15 wherein the predetermined range is selected from a group consisting of 1–2, 1–1.25, 1.25–1.5, 1.5–1.75, 1.75–2, 1.5–2, and 1.6–2.

17. The apparatus of claim 15 wherein the fractal estimator further comprises a boundary image generator adapted to generate a boundary image from the difference of a dilated image and an eroded image, the dilated image and eroded image formed from the captured image using an L-sized structuring element.

18. The apparatus of claim 15 wherein the boundary image generator is further adapted to generate a first boundary image characterized by a first scale, $L_1$, and a second boundary image characterized by a second scale, $L_2$, wherein the ratio of $L_2$ to $L_1$, is in a range selected from a group consisting of 1–4, 4–8, 8–16, and greater than 16.

19. An apparatus for automatically focusing an object comprising:

an image capture sensor for capturing an image of the object, the captured image characterized by a focal distance;

means for determining a fractal pixel count of the captured image; and means for controlling the focal distance based upon maximizing the fractal pixel count of the captured image.

20. A computer program product for use with an automated microscopy system, the computer program product comprising:

a computer usable medium having computer readable program code means embodied in the computer usable medium for causing the automated microscopy system to automatically focus an object, the computer program product having:

computer readable code means for causing a computer to acquire an image of the object at a focal distance;

computer readable code means for causing the computer to determine a fractal pixel count of the acquired image; and computer readable code means for causing the computer to adjust the focal distance of the object based upon maximizing the fractal pixel count of the acquired image.

* * * * *